P. D. JONES.
RESTAURANT FIXTURE.
APPLICATION FILED FEB. 19, 1920.

1,399,125.

Patented Dec. 6, 1921.

2 SHEETS—SHEET 1.

Inventor:
Phillip D. Jones
by James T. Burkett
his Attorney

P. D. JONES.
RESTAURANT FIXTURE.
APPLICATION FILED FEB. 19, 1920.
1,399,125.
Patented Dec. 6, 1921.
2 SHEETS—SHEET 2.
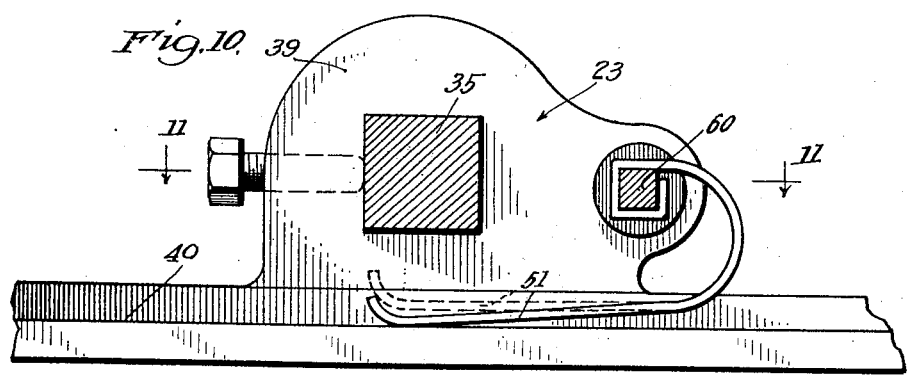
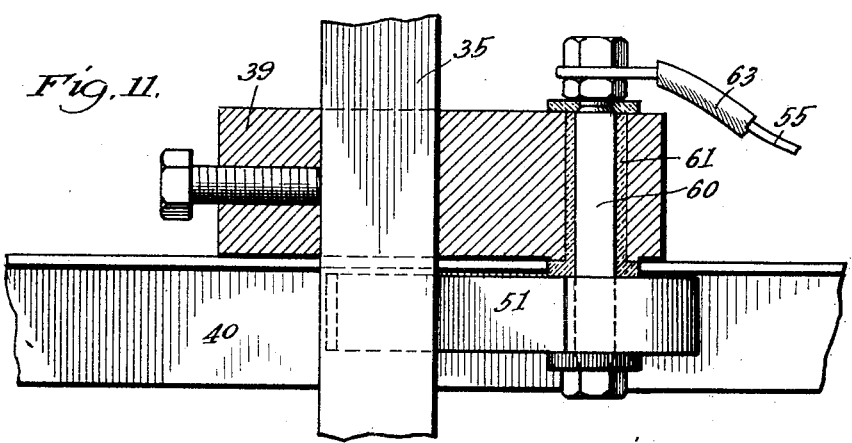
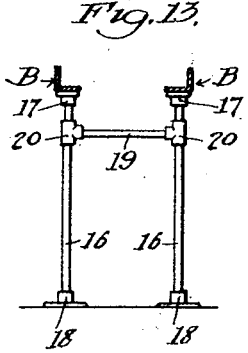
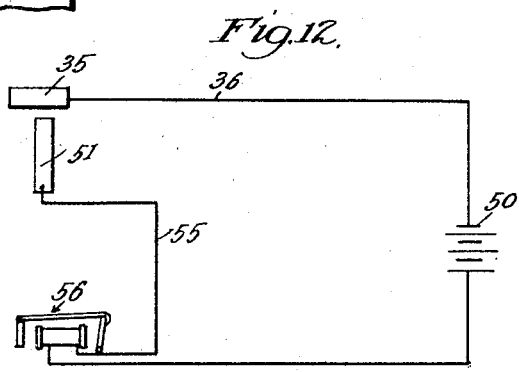
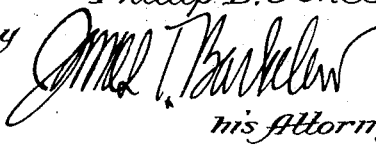

UNITED STATES PATENT OFFICE.

PHILLIP D. JONES, OF LOS ANGELES, CALIFORNIA, ASSIGNOR OF ONE-HALF TO CLYDE VAN HOOSE, OF LOS ANGELES, CALIFORNIA.

RESTAURANT-FIXTURE.

1,399,125.   Specification of Letters Patent.   Patented Dec. 6, 1921.

Application filed February 19, 1920. Serial No. 359,994.

*To all whom it may concern:*

Be it known that I, PHILLIP D. JONES, a citizen of the United States, residing at Los Angeles, in the county of Los Angeles, State of California, have invented new and useful Improvements in Restaurant-Fixtures, of which the following is a specification.

This invention relates to restaurant fixtures and it is an object of the invention to provide improved, effective and sanitary fixtures of this general character.

A particular object of the invention is to provide fixtures adapted for use in restaurants, cafeterias, and like places, which are sightly, effective, and which permit of sanitary handling of food. The sightliness of the fixtures is due to their extremely simple and open construction which combines neatness and effectiveness.

A feature of the food carrying rack provided by the present invention is the manner in which the food is protected from dust and against being unnecessarily handled, at the same time being on display. Receptacles, carrying food, are not placed on shelves, counters, or the like, but are suspended under glass covers or plates so as to be protected and at the same time visible.

A further and important feature of the invention is the tray rack which is extremely simple and inexpensive, yet effective. The tray rack is adapted to support or carry trays in such a manner as to make it impossible to remove them until they have been moved to a pre-determined point. By providing a tray rack of this character numerous rails, partitions, etc., at present necessary in cafeterias, and the like, are eliminated. Further, the tray rack when combined or arranged in connection with the food carrying rack, in the manner hereinafter specified, permits of, or makes possible, an extremely simple, quick, and sanitary system or method of handling food.

A noteworthy object of the present invention is to provide fixtures of the character above referred to which eliminate numerous unsanitary, unsightly, and ineffective devices such as counters, shelves, railings, etc. The construction employed in carrying out the present invention is simple, inexpensive, and permits of easy and effective cleaning. Further, the construction used throughout the fixtures provided by the present invention, is open and unrestricted thereby allowing free circulation of air and eliminating sour and unsanitary conditions.

There are further objects and features of the invention which are set forth in, and which will be readily understood from, the following detailed description of a preferred embodiment of the invention throughout which reference is had to the accompanying drawings, in which—

Figure 1 is a diagrammatic view showing a manner in which the fixtures provided by the present invention may be arranged; Fig. 2 is a view similar to Fig. 1 showing another arrangement of the fixtures; Fig. 3 is an enlarged detail section of the tray rack, being a view taken as indicated by line 3—3 on Fig. 1; Fig. 4 is an enlarged view taken as indicated by line 4—4 on Fig. 1; Fig. 5 is a front elevation of a portion of the food carrying rack being an enlarged view taken as indicated by line 5—5 on Fig. 1; Fig. 6 is an enlarged front elevation of a portion of a food carrying rack; Fig. 7 is a sectional view taken as indicated by line 7—7 on Fig. 6; Fig. 8 is an enlarged detail section taken as indicated by line 8—8 on Fig. 5; Fig. 9 is an enlarged section taken as indicated by line 9—9 on Fig. 5; Fig. 10 is an enlarged detail section taken as indicated by line 10—10 on Fig. 6; Fig. 11 is an enlarged detail section taken as indicated by line 11—11 on Fig. 10; Fig. 12 is a diagram of one unit of the annunciator system which is arranged in connection with the food carrying rack; and Fig. 13 is a sectional view similar to Fig. 3, being an enlarged sectional view of one end of the tray rack taken as indicated by line 13—13 on Fig. 1.

Referring particularly to Fig. 1 of the drawings, A designates a pile of trays arranged or located at the front or outer end of the tray rack B. In the particular arrangement shown, there are two piles or trays A and two tray racks B. The tray racks B, the details of which are hereinafter set forth, are adapted to receive trays from the piles A and hold or carry them until they have been moved, or advanced past the cash registers C, which are arranged at the rear or back ends of the racks. A patron upon placing a tray from one of the piles A onto one of the racks B advances or proceeds along the outer side of the tray rack staying with the tray while attendants located behind the rack B, between the rack B and the food carrying rack D, place what food the patron desires or directs onto the tray. The patron being on the outside of the tray rack B can not reach articles carried by the food carrying rack D, but must direct the attendants, located between the tray rack B and the food carrying rack D, as to what articles of food he desires. The tray may be advanced toward the rear or back end of the tray rack B, either by the patron or by the attendant, while the desired articles are being placed on it and until it has passed the cash register C. Upon passing the cash register C the tray reaches the portion B' of the tray rack B where it may be lifted or removed from the rack. The tray, placed on the rack B by the patron, being advanced by the attendants back of the tray rack, or by the patron himself if he desires, makes it necessary for the patron to keep his place among other patrons who have trays in the rack, and further than that, makes it necessary for him to advance at substantially the same rate that the other patrons are advancing. In Fig. 1 it will be noted that the tray racks B are parallel with each other and that the food carrying racks D are arranged between and parallel with the tray racks B so that there is an aisle or space E between the two food carrying racks D. The aisle E provides a space where an attendant may be located to place articles of food in the food carrying racks D from the rear of the racks and without in any way bothering or interfering with the attendant between the tray racks and the food carrying racks. This particular arrangement permits of rapid, effective, and uninterrupted service on the part of the attendant between the tray racks and the food carrying racks and requires a minimum amount of space.

In Fig. 2 of the drawings is shown another form or arrangement of the fixtures. Throughout Fig. 2 the various parts are the same in design and construction as the parts shown in Fig. 1 and are designated by the same letters as the parts in Fig. 1. It will be noted in Fig. 2 however, that the tray racks B are not parallel with each other but diverge rearwardly from the piles of trays A, each tray rack B having a food carrying rack D arranged parallel with it. With this arrangement the space between the food carrying rack D is triangular in shape and permits of a triangular shaped table, or suitable apparatus F, being arranged between the food carrying racks so that there is an aisle E back of, or to the rear of, each food carrying rack D, rather than a common aisle E for both racks as in the case illustrated in Fig. 1. With this particular arrangement the unit F provides a very convenient serving table, stove, or like apparatus from which articles of food may be placed conveniently and quickly into the food carrying racks D.

The various tray racks B and the various food carrying racks D shown in Figs. 1 and 2 of the drawings are alike in construction and design so I will proceed to describe one of the tray racks and one of the food carrying racks in detail, it being understood that such description is applicable to all of the tray racks and food carrying racks.

The tray rack, as shown in Figs. 3, 4 and 13, comprises two oppositely disposed inwardly facing channel members 10 supported on a suitable frame structure 11. The channels 10 are preferably spaced apart sufficient distance to neatly and effectively carry a tray 12 between them, in the manner illustrated in Fig. 3. The lower flanges 13 of the channels 10 prevent the tray or trays 12 from falling from the tray rack, the vertical walls 14 of the channels prevent horizontal displacement of the tray from the rack, while the upper flanges 15 prevent the tray from being lifted out of or away from the rack. At the front or forward end of the channels 10, and at the rear ends of the channels 10 at a point past the cash register C, the upper flanges 15 are removed to permit of placing trays in and removing trays from the rack.

The standards 11 which support the channels 10 preferably comprise vertical members 16, preferably pipe, connected to the channels 10 by brackets 17, and provided at their lower ends with flanged base members 18. It is preferred although not necessary, that there be a cross member or spreader 19 between opposite vertical members 16 to hold them in the proper spaced relation. It will be understood that the channels 10 may be spaced various distances apart to properly carry various sized trays. If the vertical members 16 are formed of pipe the cross members 19 may also be pipe, and the connections, between the cross members and the vertical members, may be T's 20. This particular form of standard construction is merely typical and does not in any way limit or restrict the invention as various other forms of construction can be advantageously used.

The particular form, or construction, of tray racks B just set forth is neat, extremely inexpensive to manufacture, is sightly, and particularly sanitary, as it may be easily and thoroughly cleaned with a minimum amount of labor.

The food carrying rack D comprises a plurality of vertical standards 21 between which extend cover plates 22 and receptacle supporting brackets 23. The standards 21 may be of any desired height or shape although it is preferred that they be approximately five feet high and that they have lower vertical portions 24 and upper rearwardly tilted portions 25. The standards 21, like the standards 11, are preferably constructed of pipe the upper and lower members being connected by a suitable coupling 26, and the lower ends of the vertical members 24 being provided with suitable flanged bases 27.

It will be understood that the standards 21 may be arranged in pairs, that is, two standards spaced apart with cover plates 22 and receptacle bracket 23 extending between them to form a unit, or that a plurality of standards 21 may be arranged together and connected by cover plates 22 and receptacle carrying brackets 23 in the manner illustrated in Fig. 5 of the drawings. The cover plates 22 are preferably transparent glass, or like material, carried between brackets 30 mounted on the standards 21. The brackets 30 are adjustably carried on the standards 21, having bored portions 31 which receive the pipes or the members of the standards 21. Horizontal grooved arms 32 are formed integral with the bored portions 31, of the brackets 30, and are adapted to receive and grip the ends of the cover plates 22. It will be understood that brackets 30 which are to be used in connection with the vertical members 24, of standards 21, may be constructed or arranged so that the bored portions 31 are at right angles with the cross arms 32, as shown in Fig. 8, and that brackets 31 which are to be used in connection with the tilted members 25 must be constructed so that the arms 32 are at an angle with the bored portions 31, as clearly illustrated in Fig. 9. The grooved arms 32 grip the ends of the cover plates 22 fairly tight but allow the cover plates to be completely withdrawn or removed from them for purposes of cleaning or replacing. The bored portions 31, of the brackets 30, slidably fit on the members 24 and 25, of the standards 21, and are adapted to be locked or set in the desired positions by set screws 33.

Rods 35, preferably square in cross sectional configuration, extend between opposite brackets 31 directly below the cover plates 22, as illustrated in the drawings. The ends of the rods 35 are carried in the lower portions of the brackets 30 and are locked or set by set screws 37. Receptacle carrying brackets 23 are carried in pairs on the rods 35 to support the food carrying receptacles 38. The receptacle carrying brackets 23 comprise portions 39, which are slidably carried on the rods 35, and horizontal slides 40, formed integral with the portions 39 and so as to be at right angles with the rods 35. The brackets 23 are arranged in pairs on the rods 35 so that the food containing receptacles 38 may be arranged between them so that the flanges 41, of the receptacles 38, are carried on the slides 40. It will be readily understood how the brackets 23 may be arranged in pairs on the rods 35 and how they may be spaced various distances apart to accommodate or support, various sized receptacles 38. The receptacles 38 may vary in size, depth, and configuration providing they have flanges 41 to engage, or be carried on, the slides 40. The ends of the slides 40 are unrestricted thereby making it possible to place receptacles 38 in the brackets 32, or to withdraw them from the brackets 32, either from the front of the rack or from the rear of the rack. With the rods 35, which carry the bracket 23, arranged directly below the cover plates 22, the food containing receptacles 38 are suspended close to and directly below the cover plates 22 and are thereby protected and guarded by them.

In the preferred form of the invention an announciator system is arranged in connection with the food carrying rack so that the removal of a food containing receptacle from the rack is announced in the kitchen or to the attendant whose duty it is to keep the rack supplied with receptacles containing food. For the purpose of illustrating the manner in which the announciator system is arranged in connection with the rack, a single unit is illustrated in Fig. 12 of the drawings. Referring to the diagram in Fig. 12 together with the various other figures of the drawings, numeral 50 designates a battery, or the like, one terminal of which is connected to rod 35 by a suitable connector or wire 36. The rod 35 acts as, or forms a bus bar and carries the receptacle carrying bracket 23 which forms a contact adapted to be engaged by a spring contact 51 when there is no receptacle 38 being carried by the slide 40, of the bracket 23. When a receptacle 38 is in the rack the flange thereof lifts the contact 51 to the position shown in dotted lines in Fig. 10. When the receptacle 38 is removed from the rack the spring contact 51 is allowed to move downwardly onto the slide 40 and thereby make an electrical connection between the contact 51 and bus bar 35. The spring contact 51 is connected by a suitable wire 55 to the second terminal of the battery 50, the announciator 56 being interposed in the line, or wire, between the contact 51 and the second terminal of the battery. When the connection between the contact 51 and the slide is made the announciator 55 is actuated and indicates to the attendant that the receptacle has been removed from the rack.

Although I have explained the operation of only one of the announciators it will be readily understood how each pair of brackets 23 is connected up or arranged in exactly this manner. There is one spring contact in connection with each pair of brackets 23 and it may be mounted on one of the brackets 23 by a suitable bolt 60 insulated from the bracket by insulation 61. The lead wires 55 which connect to the spring contacts 51, may be arranged in cables 63 which extend downwardly through the standards 21, under the floor upon which the fixtures are mounted, and to the case 65, in which the annunciators 55 and battery 50 are arranged.

If it is so desired a hot table 70 may be arranged in connection with the food carrying rack D in order to keep certain articles of food hot and also that a refrigerator or ice box 71 may also be arranged in connection with the food carrying rack D to keep certain articles of food cold.

Having described a preferred embodiment of my invention I do not wish to limit or restrict myself to the specific details above set forth but wish to reserve to myself any changes or variations that may appear to those skilled in the art or that may fall within the scope of the following claims.

Having described a preferred form of my invention, I claim:

1. A fixture of the character described, comprising, standards, cover plates carried between the standards, and receptacle carrying brackets arranged close under the cover plates.

2. A fixture of the character described, comprising, standards, brackets mounted on the standards, cover plates carried by the brackets, rods carried by the brackets parallel with and close under the cover plates, and receptacle carrying brackets mounted on the rods.

3. A fixture of the character described, comprising, standards, a plurality of brackets adjustably carried on the standards, a plurality of glass cover plates horizontally carried by the brackets, a plurality of rods carried by the brackets to be parallel with and close under the cover plates and so that there is a rod under each cover plate, and a plurality of receptacle carrying brackets adjustably mounted on each rod, the receptacle carrying brackets being arranged in pairs to support receptacles so that they can be placed in and removed from the rack from either side.

4. A fixture of the character described, comprising, standards, brackets adjustably carried on the standards, a plurality of flat glass cover plates horizontally carried between the standards by the brackets, rods carried by the brackets to be parallel with and close under the cover plates, a plurality of pairs of receptacle carrying brackets adjustably mounted on the rods, each of said last mentioned brackets comprising a portion slidably carried on a rod and a horizontal slider portion adapted to carry the flange of a receptacle.

5. A fixture of the character described, comprising standards, cover plates carried by the standards, receptacle carrying brackets arranged close under the cover plates, and means in connection with the receptacle carrying brackets to announce the removal of receptacles.

6. A fixture of the character described, comprising standards, cover plates carried between the standards, receptacle carrying brackets arranged close under the cover plates, an annunciator in connection with each receptacle carrying bracket, and means in connection with the receptacle carrying brackets to cause operation of the annunciators when receptacles are removed from the rack.

7. A fixture of the character described comprising, standards, brackets adjustably carried on the standards, a plurality of flat glass cover plates horizontally carried between the standards by the brackets, rods carried by the brackets to be parallel with and close under the cover plates, a plurality of pairs of receptacle carrying brackets adjustably mounted on the rods, each of said last mentioned brackets comprising a portion slidably carried on a rod and a horizontal slider portion adapted to carry the flange of a receptacle, an annunciator arranged in connection with each pair of receptacle carrying brackets, and control means for the annunciators in connection with the receptacle carrying brackets to cause actuation of the annunciators when the receptacles are removed from the rack.

8. In combination a tray rack adapted to carry trays so that they are removable from it only at its ends, and a receptacle rack arranged parallel with the tray rack, the tray and receptacle racks being substantially coextensive.

9. In combination a tray rack adapted to carry trays so that they are removable from it only at its ends, a receptacle rack arranged at one side of the tray rack, the tray and receptacle racks being substantially coextensive, and a walk way at the other side of the tray rack.

10. In combination a tray rack adapted to carry trays so that they are removable from it only at its ends, and a receptacle rack arranged parallel to and spaced from the tray rack, the tray and receptacle racks being substantially coextensive.

11. In combination a tray rack adapted to carry trays so that they are removable from it only at its ends, a receptacle rack substantially coextensive with the tray rack and arranged parallel with the tray rack, the receptacle rack being spaced a substantial distance from one side of the tray rack, and a walk way at the other side of the tray rack.

12. A fixture of the character described, comprising, standards, cover plates adjustably carried by the standards, and receptacle carrying brackets arranged close under the cover plates.

13. A fixture of the character described comprising, standards, cover plates carried by the standards, and receptacle carrying brackets arranged close under the cover plates.

14. A fixture of the character described comprising, standards, a cover plate carried by the standards, and an adjustable receptacle carrying bracket arranged close under the cover plate.

15. A fixture of the character described comprising, standards, brackets adjustably mounted on the standards, cover plates carried by the brackets, rods carried by the brackets parallel with and close under the cover plates, and receptacle carrying brackets mounted on the rods.

16. A fixture of the character described comprising, standards, brackets mounted on the standards, cover plates carried by the brackets, rods carried by the brackets parallel with and close under the cover plates, and receptacle carrying brackets adjustably mounted on the rods.

17. A fixture of the character described comprising, standards, cover plates carried by the standards, receptacle carrying brackets arranged close under the cover plates, and means for announcing the removal of receptacles from the brackets.

18. A fixture of the character described comprising, standards, cover plates carried by the standards, receptacle carrying brackets arranged close under the cover plates, and means for announcing the removal of receptacles from the brackets at a point substantially removed from the other parts of the fixture.

19. A fixture of the character described comprising, standards, cover plates carried by the standards, receptacle carrying brackets arranged close under the cover plates, and electrically operated means for announcing the removal of receptacles from the brackets.

In witness that I claim the foregoing I have hereunto subscribed my name this 10th day of February, 1920.

PHILLIP D. JONES.

Witness:
VIRGINIA I. BERINGER.